3,552,943
ALKALATED HUMIC ACID-SILICA COMPOSI-
TIONS FOR FERTILIZERS AND THE LIKE
AND METHODS OF MAKING SAME
Roger W. McCormack, Pittsburgh, Pa., assignor to Scientism Laboratories, Inc., Pittsburgh, Pa., a corporation of Pennsylvania
No Drawing. Filed June 26, 1967, Ser. No. 649,010
Int. Cl. C05f 11/00, 11/02
U.S. Cl. 71—23                              19 Claims

ABSTRACT OF THE DISCLOSURE

Fertilizer materials and the like, including alkalated humic acid-silica compositions.

BACKGROUND OF THE INVENTION

(1) Field of the invention

This invention relates to fertilizers and, more particularly, to fertilizer compositions that are especially advantageous for use with crops such as, for example, rice and bamboo, which require a high proportion of silica for proper nurture and growth.

(2) Description of the prior art

The effect of silica in the formation of marketable rice is highly pronounced since the establishment of a sound husk is one of the important determining factors relating to the size and health of the kernel of rice. It is apparent that proper bonding of silica chemically with the appropriate organic material in the rice plant at the proper time contributes greatly to increase the yield and quality of the crop. With an optimum amount of silica available for growth of the rice hull or husk to give it the proper chemical structure, the soundness of the hull is enhanced whereby the most effective seal and protection is provided for the rice kernel itself which is accordingly afforded more protection against disease, pests, and the vagaries of weather, thereby increasing the quantity and quality of the crop.

It has been common knowledge in rice-producing countries of the world that a continuous lowering of the concentration of available silica in the soil of rice paddies results in a comparable decreasing growth rate and deficient health of rice plants. Lack of available silica greatly lowers the yield of rice and increases the susceptibility of rice to diseases such as blast and brown spot and insect predation. Attempts to restore the productivity of silica-exhausted rice paddies by standard fertilizers have been generally unsuccessful.

SUMMARY AND DESCRIPTION OF THE INVENTION

Since silica is normally a refractory material, it would obviously be ineffectual to apply it directly to the soil. According to the present invention, therefore, I have conceived of and discovered compositions and methods for making such compositions that are effective, when applied to rice paddies, in furnishing the requisite silica in transferable form to be taken up or absorbed by the feeder roots of the rice plants in a most efficient manner.

According to the present invention, I form an ammonium humate silica complex or composition which is not only compatible with the soil conditions around the feeder roots, but also provides the necessary nutrient for such plants that have high percentage silica requirements.

One feature of the invention is the process of improving the health and yield of rice crops, bamboo crops and other crops having high silica requirements by means of feeding the plant soils with suitable fertilizers bearing silica in its most assimilable form, as in an ammonium humate silica complex.

Not only is the ammoniated humic acid silica complex useful for high silica content crops such as rice and bamboo, but it is also advantageous for other crops having a lower silica requirement, since the silica in an ammoniated humic acid complex is effective in increasing the absorptive capacity of the plants for other essential nutrients by way of chelating action or by ion exchange mechanisms. Silica plays an important role in the metabolic process of many plants and, therefore, when it is present in its most viable form, as in ammoniated humic acid silica complex, as applied to the soil, it has a most beneficial effect on many agricultural plants. When the silica is in the water soluble form as complexed with ammonium humate, it is believed that the complex acts either as an ion exchange medium or as a chelating agent to act upon soluble or ionized materials that are present in the soil and that are necessary for plant growth and to transport them in viable form to the feeders of plant roots.

Another feature of the process of the invention is to ensure that the silica component of the fertilizer complex is in a form that is most compatible with the form in which it is transferred and absorbed into the plant and as it exists in the plant during and after its growth process. According to a preferred form of the invention, care is taken to derive the silica component from a source that is similar or analogous to the plant that is to be fertilized and, during the process of formation of the fertilizer, to retain the integrity of the silica formed, notwithstanding the intermediate steps and treatments through which the components of the fertilizer are subjected to until the final fertilizer composition is achieved. It is believed that silica may occur in rice or bamboo in the tetrahedral form and care is taken during the processes herein to prevent the tetrahedral silica from being converted into some other form of silica that might be less compatible or less assimilable than may be desirable or optimum.

An important advantage realized by the present invention is that the application of the subject complexes or compositions to the rice paddies produces the desired result of improving the resultant crop in the same season of fertilizer application. There is no time delay as is experienced with other fertilizers where the restoration of productivity to the soil requires several successive fertilizer applications in order to obtain optimum results. Accordingly, the use of the complexes and compositions of the present invention saves the farmer from losses due to field or paddy rotation and due to leaving fields or paddies fallow and unproductive for one or more seasons in order to restore the fertility of the soil.

As source material for silica in its optimum form, it is preferred to utilize all the residual parts of the rice plant after the rice kernels have been removed, or other agricultural waste which contains a high percentage of silica in the form which is or may be indigenous to the rice plant itself. Other possible sources of silica are plants of high silica content such as bamboo, and other plants and cereals. Bamboo is particularly advantageous in view of the fact that it often grows in regions where rice is cultivated.

The fertilizer of the present invention contemplates as a base constituent the substance known in its various forms as humic acid, which includes decomposed, putrified, and decayed vegetable or animal matters. Humic acid also occurs in large quantities in brown coal, lignite, peat-bog, forest earth, humus, and the like. The derivation of humic acid and its analogues by various means from different sources such as chemical oxidation or microbiological processes, is well known in the art. Since soybean farming is often located adjacent or near rice farms in various parts of the world, it will be both advantageous and economical to utilize soybean wastes as a source for the humic acid which can be derived in large proportions from such source as compared with the lesser proportions of humic acid derivable from other sources.

The humic acid derived from the various sources is usually in the form of a dark brown powder which has been completely washed of any extraneous material and dried. Thereafter, the humic acid is reacted with ammonia to render it water soluble and in which condition it is in the form of a liquid known as ammoniated humic acid or ammonium humate.

The silica derivation comprises subjecting the rice of bamboo waste, or a combination of these materials, to an oxidizing action to remove all organic material therefrom. Oxidation may take place by means of ignition provided it is maintained at a low enough temperature which will not alter the structure of the silica, while completely converting all of the organic material into an ash which is readily removable by washing. Such ignition oxidation may be performed in a closed vessel containing atmospheric oxygen.

Alternatively, oxidation may be accomplished by means of treating the rice or bamboo waste with nitric acid or concentrated sulfuric acid. Optionally, additional oxidizing agents may comprise potassium permanganate, or hydrogen peroxide, or ozone, or any combination thereof. The acid oxidation may also be performed in a closed vessel or autoclave.

After the atmospheric oxidation or the acid oxidation is completed, the ash is readily removed by suitable washing techniques, leaving the silica residue. It is advantageous that in deriving the silica from the rice or bamboo waste, the impurities be removed by washing or otherwise, so that any extraneous constituents or materials will not be present that might otherwise prove injurious or deleterious to the plant. By the careful derivation of silica in accordance with the controlled temperature conditions and necessary procedures, the possibilities of substantially retaining the proper molecular structure of silica which is most compatible with and assimilable to the plant to be fertilized, is greatly enhanced.

Thereafter, the ammoniated humic acid is now combined with the silica in suitable proportions to produce a gelatinous or colloidal mixture with comprises a complex salt of ammoniated humic acid and silica which may also be designated as ammonium-humate-silica complex and which is transferable in a water medium to the root feeders. The respective proportions of the ammoniated humic acid and of silica for forming the desired complex will be determined by the nature and source of the humic acid which, in actuality, is a designation for a broad group of compounds whose exact composition varies in accordance with their source.

It will be noted that in order to make the humic acid soluble in water, it is necesary to turn it into an alkaline state which can be accomplished by treating the humic acid with ammonia, ammonium hydroxide, sodium hydroxide, potassium hydroxide, or any other suitable alkali. Since, however, the humic acid component is intended for use as a fertilizer which has natural ammonia or nitrogen demands, it is preferred to render the humic acid alkaline by treatment with ammonia. Since the pH of the resultant humate is important for soil treatment and for the acceptance of the silica into a complex, and since the metabolic action of the nitrogen cycle is dependent upon the silica content of the complex, it will be necessary to adjust and possibly buffer the resulting humate silica complex. It is preferred, however, to produce the ammonium form of the humate silica complex or composition which has a proper pH, is water soluble, and is readily transferable into the plant feeders.

When the ammoniated humic acid silica composition is applied as a fertilizer to the soil in rice paddies or the like, an efficient transmission of the silica in its proper form takes place through the liquid medium by seepage through the soil to the root feeders of the plant. Since the silica is in the form that is most compatible with that in which it occurs in the rice plant, it is most efficiently transmitted through the feeders into the roots and thence assimilated in the stalk, hulls, and kernels of the rice plant.

It is also within the contemplation of the present invention that the silica component of the ammonium humate silica complex may be derived from other than plant sources. The silica may be derived from silicic acid by standard processes well known in the art, said silica then being combined with the ammoniated humic acid to form the ammonium humate silica complex. It is believed, however, that it may be more economical to derive the silica from rice or bamboo wastes whereby the latter may be put to use instead of creating disposal problems with which agriculturalists are now confronted.

Although the present invention has been described with reference to particular embodiments and examples, it will be apparent to those skilled in the art that variations and modifications can be substituted therefor without departing from the principles and true spirit of the invention. The "Abstract" given above is for the convenience of technical searchers and is not to be used for interpreting the scope of the invention or claims.

What is claimed is:

1. The compound ammonium-humate-silica complex.
2. The compound ammonium-humate-silica complex in which the silica component is derived from rice waste.
3. The compound ammonium-humate-silica complex in which the silica component of said humate is derived from silicic acid.
4. The compound ammonium-humate-silica complex in which the silica component of said humate is derived from rice waste which has been oxidized under controlled conditions substantially to retain the integrity of the molecular structure of the silica as it exists in said waste.
5. A fertilizer including the compound ammonium-humate-silica complex.
6. A fertilizer composition containing the compound resulting from ammoniated humic acid being combined with silica to form a water soluble complex.
7. The compound alkalated-humate-silica complex.
8. The compound alkalated-humate-silica complex in which the silica component of said humate is derived from rice waste.
9. Alkalated-humate-silica complex in which the silica component of said humate is derived from silicic acid.
10. The method of increasing the yield and quality of a rice crop comprising the spreading of the compound ammonium-humate-silica complex upon the rice paddy.
11. The method of increasing the yield and quality of plants having a high silica content, comprising the spreading of the compound ammonium-humate-silica complex on the fields of such plants.
12. The method of increasing the yield and quality of plants having a high silica content, comprising the spreading of the compound ammonium-humate-silica complex on the fields of such plants, the silica component of said humate being derived from rice waste which has been oxidized under controlled conditions substantially to retain the integrity of the molecular structure of the silica as it exists in said waste.
13. The method of forming the compound ammonium-humate-silica complex comprising the oxidation of agricultural waste containing a high silica content, said oxidation being conducted under controlled temperature and pressure conditions substantially to retain the integrity of the molecular structure of the silica as it exists in said waste, and thereafter combining said silica with ammoniated humic acid.
14. The method of making a fertilizer comprising oxidizing agricultural waste containing a high percentage of silica, said oxidation being performed in a closed vessel containing atmospheric oxygen at a temperature below that which would otherwise alter the molecular structure of the silica in said waste, and combining said silica with ammoniated humic acid to form a compound.

15. The method of making a fertilizer comprising oxidizing agricultural waste containing a high percentage of silica, said oxidation being accomplished by means of treating said waste with an oxidizing agent selected from a group consisting of nitric acid and concentrated sulfuric acid, and combining the resulting silica with ammoniated humic acid to form a compound.

16. The method according to claim 15 and further comprising the use of one or more additional oxidizing agents selected from the group consisting of potassium permanganate, hydrogen peroxide, and ozone.

17. The compound ammonium-humate-silica complex in which the silica component is derived from agricultural waste containing a high silica content.

18. The compound alkalated-humate-silica complex in which the silica component of said humate is derived from agricultural waste containing a high silica content.

19. The compound ammonium-humate-silica complex in which the silica component of said humate is derived from agricultural waste containing a high silica content and which has been oxidized under control conditions substantially to retain the integrity of the molecular structure of the silica as it exists in said waste.

References Cited

UNITED STATES PATENTS 2,093,047    9/1937    Hudig _____ 71—27

REUBEN FRIEDMAN, Primary Examiner

R. M. BARNES, Assistant Examiner

U.S. Cl. X.R.

71—24, 27, 62; 260—515